April 6, 1954

S. GARIK 2,674,357

TORQUE OVERLOAD CONTROL

Filed Jan. 31, 1952

INVENTOR
SERGE GARIK

BY Stowell + Evans

ATTORNEYS

April 6, 1954
S. GARIK
2,674,357
TORQUE OVERLOAD CONTROL
Filed Jan. 31, 1952
2 Sheets-Sheet 2
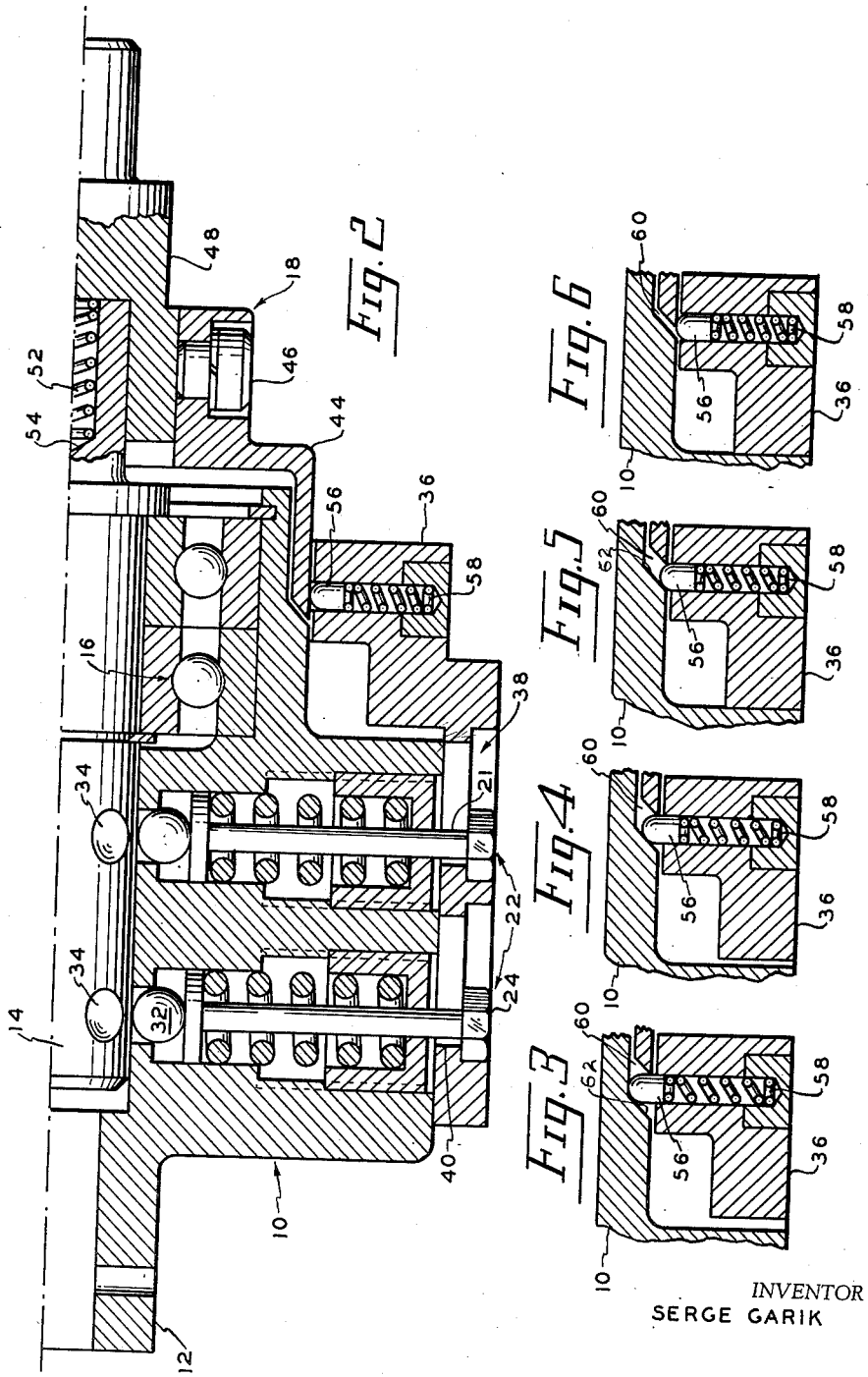
INVENTOR
SERGE GARIK
BY *Stowell + Evans*
ATTORNEYS Patented Apr. 6, 1954

2,674,357

UNITED STATES PATENT OFFICE 2,674,357

TORQUE OVERLOAD CONTROL

Serge Garik, New York, N. Y., assignor to Research Corporation, New York, N. Y., a corporation of New York Application January 31, 1952, Serial No. 269,269

4 Claims. (Cl. 192—56)

This invention relates to an improvement in torque overload control devices, and in particular to lock and lock release means for limited torque couples.

An object of this invention is to provide an improved limited torque couple for mechanical drive systems that may be advantageously applied to power wrenches, screw drivers and the like.

A further object of the invention is to provide means for locking a limited torque couple in the disengaged position.

Another object is to provide automatic disengaging means for the locking device.

A further object is to provide such a device which will operate equally well in either direction of rotation.

Another object is to provide such a device that is rugged in construction and readily adaptable to various load and operating conditions.

These and other objects and advantages are provided by the torque overload control device of the invention which generally comprises in combination with a driver member, a driven member and a detent carried by one of said members spring urged into engagement with the other of said members and disengaged therefrom at a predetermined torque load, a locking member carried by said one of said members for holding the detent in disengaged position, and means actuated by axial movement of the driven member for freeing the detent from the locking member.

The invention will be more particularly described with reference to the illustrative embodiment shown in the accompanying drawings in which:

Fig. 2 is a fragmentary sectional view of the device shown in Fig. 1 with the driver and driven members locked in the disengaged position; and Figs. 3 through 6 are fragmentary sectional views of the lock disengaging mechanism in various stages of operation.

Figure 1:
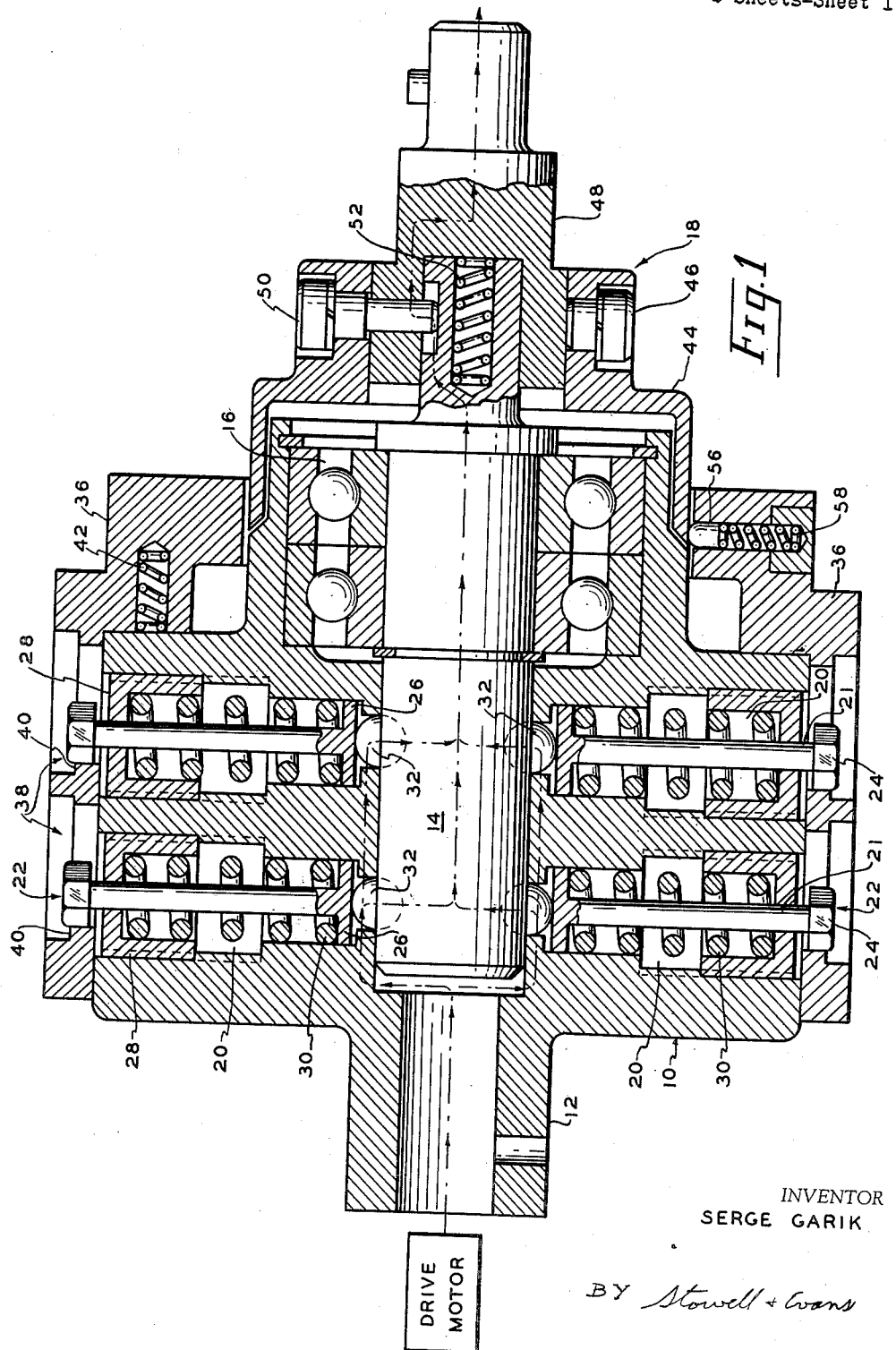
Fig. 1 is a sectional plan view of a limited torque couple embodying the principles of the invention.

With reference to the drawings, 10 is the driver member of a limited torque couple. It is provided at one end with a boss 12 to receive a drive shaft, not shown in the drawings, connected to any suitable drive motor. The driven portion of the couple generally comprises a shaft 14 axially mounted for rotation within the driver member 10 by bearings 16. The forward end of the driven shaft 14 carries the lock release mechanism 18 to be more particularly described hereinafter.

Radially carried in spaced recesses 20 in the driver member 10 of the torque couple are a plurality of spring urged detents 22. Each detent generally comprises a plunger 21 provided with a head 24 and base 26. The plungers are retained in the recesses 20 by retaining caps 28. Coil springs 30 bear at one end against the retaining caps 28 and at the other end against the bases 26 of the plungers whereby the plungers are urged radially inwardly. At the inward end of the plungers are spherical members 32 which in normal operation engage sockets 34 in the driven shaft 14. The sockets 34 are more clearly shown in Fig. 2 of the drawings.

It will thus be seen that under normal loads, power is transmitted from the driver member through the spheres 32 to the driven shaft 14, and when the load increases beyond a predetermined amount, the spheres 32 are forced from the sockets 34 against the spring 30 and the driver member rotates about the driven shaft 14. This torque path is shown by arrows in Fig. 1 of the drawings.

The power transmitting limit of the torque couple may be variously controlled, for example by the number of detents employed in the couple, the force of the springs 30, and the depth of the sockets 34 in the driven shaft. Thus it will be seen that the power which may be transmitted may be readily varied by merely adjusting the position of the retaining caps 28 in the recesses 20 of the driver member.

Limited torque couples of the above described form have not proved entirely satisfactory in a large number of applications because of generation of heat in the couple after overload conditions have developed and the strong knocking action caused by the torque transmitting spheres engaging and disengaging the ball sockets in the driven member when overload conditions are encountered.

It has been found that if such overload controls are used in torque tools for tightening nuts and bolts or the like the knocking action will, due to momentum of the rotating parts, tend to tighten the work piece beyond the preselected torque.

To overcome these disadvantages a locking mechanism has been provided which will automatically retain the detents 22 in the disengaged position and prevent action of the springs 30 upon the torque transmitting sphres 32 of detents 22.

The locking mechanism generally comprises a sleeve 36 which is slidably secured to the portion of the couple which carries the spring biased detents 22. The sleeve 36 is provided with openings 38 having shoulders 40 for each of the detents.

The shoulders 40 are adapted to slip under the heads 24 of the detents when the detents are in the disengaged position as shown in Fig. 2 of the drawings.

The locking sleeve is urged into the locked position by coil springs 42, one of which is shown in Fig. 1.

To release the detents, and reengage the torque couple, the sleeve 36 is urged rearwardly against the force of springs 42, this operation being accomplished by the lock release mechanism 18. The lock release generally comprises a sleeve 44 which is secured by bolt 46 to a stub shaft 48 slidably mounted on the tool receiving end of the driven shaft 14, by means of a set screw 50.

The set screw 50 prevents spring 52 from pushing the lock release mechanism from the driven shaft 14, and in the form of construction shown in the drawings transmits torque from shaft 14 to the stub shaft 48. It is evident, however, that sleeve 44 and stub shaft 48 may be constructed as one piece.

A coil spring 52, mounted in a recess 54 in the end of shaft 14, urges the stub shaft and lock releasing sleeve 44 forwardly, which permits the rounded nose of the plunger 56 of spring loaded detents 58 to project into space 60 as shown in Fig. 3 of the drawings. It is evident that the round nose plunger 56 may be replaced with a spherical member of suitable size. Axial movement of the sleeve 44 in a rearward direction against the tension of spring 52 will urge the detents 58 and the locking sleeve rearwardly to release the detents therefrom.

The operation of the locking sleeve and release mechanism will be more readily apparent from the following description of a cycle of operation of the device.

In operation of the device, for example, as a power operated torque tool, a screwdriver or socket wrench is attached to the end of the stub shaft 48, and the tool is pressed into engagement with the work so that sleeves 44 and 36 are urged rearwardly and power is transmitted from the drive motor through the torque couple to the tool.

These conditions are shown in Fig. 1 of the drawings and it will be seen that as long as detents 22 are in their engaged position, springs 42 cannot force the locking sleeve 36 forwardly as shoulders 40 are in contact with the heads 24 of the detents 22. However, as soon as the preselected torque limit is reached, the heads 24 of detents 22 will be clear of shoulders 40 of the locking sleeve and the sleeve will be moved forwardly by springs 42 to hold detents 22 in their outward position as is clearly shown in Fig. 2 of the drawings.

With the sleeve 36 in the detent locking position, the detents 58 are compressed radially outwardly by the lock releasing sleeve 44. When the power tool is disengaged from the working piece, spring 52 urges the stub shaft 48 and the lock release sleeve 44 forwardly permitting the plungers 56 of detents 58 to enter channel 60 as shown in Fig. 3 and the power tool is ready to be brought into engagement with the next work piece. As the tool head is forced into engagement with the work piece, spring 52 is compressed and stub shaft 48 and sleeve 44 are urged rearwardly. This axial movement of sleeve 44 pushes plunger 56 and in turn locking sleeve 36 axially rearwardly as shown in Figs. 4 and 5 of the drawings. In the position shown in Fig. 5, the sleeve 36 is at its greatest rearward displacement and detents 22 are released from shoulders 40 so that power is transmitted from the drive motor to the work piece. Plungers 56 are forced out of the space 60 by the action of the sloping end wall 62 as the rearward axial movement of the lock release 44 is continued. In Fig. 3 of the drawings the plunger is fully extended into space 60, in Figs. 4 and 5 the plunger is being forced from the space 60 and in Fig. 6 the plunger is fully retracted and lock releasing sleeve 44 is approaching its maximum rearward travel. With the detents in this position the locking sleeve 36 is "set," that is, as soon as a torque overload condition arises, sleeve 36 is free to move forward under the urging of springs 42, plungers 56 sliding over the surface of the lock releasing sleeve 44. Thus the locking mechanism is released, and reset automatically as the tool operator repositions the tool on the next work piece.

From the foregoing description it will be seen that the invention provides an improved torque limiting couple whereby the aims, objects and advantages of the invention are fully accomplished.

It will be evident that various modifications may be made in the construction and form of the torque couple and the lock and lock release mechanism. For example, both the locking sleeve and the lock release mechanism may be provided on one member of the torque couple, or the locking sleeve may be carried by the driven member and lock release mechanism by the driver member.

I claim:

1. A torque overload control device comprising, in combination with a driver member, a driven member and a detent carried by one of said members spring urged into engagement with the other of said members and disengaged therefrom at a predetermined torque load, a locking member carried by said one of said members said locking member including detent engaging means adapted to hold the detents in the disengaged position out of contact with the other of said members, spring means urging the locking member into locking position to engage the detent, a lock release detent carried by the locking member, a stub shaft slidably carried by said driven member, and means actuated by axial movement of said stub shaft for actuating the lock release detent when the locking member is in engagement with the detent.

2. A torque overload control device comprising, in combination with a driver member, a driven member and a detent carried by one of said members spring urged into engagement with the other of said members and disengaged therefrom at a predetermined torque load, a locking member slidably carried by said one of said members, a stub shaft slidably carried by said driven member, said locking member including detent engaging means adapted to hold the detents in the disengaged position out of contact with the other of said members upon reaching overload conditions, a lock release member carried by one of said members, and means actuated by axial movement of the stub shaft for operating the lock release member to free the detent from said locking member.

3. A torque overload control device comprising, in combination with a driver member, a driven member and a detent carried by one of said members spring urged into engagement with the other of said members and disengaged therefrom at a predetermined torque load, a locking member carried by said one of said members, said locking member slidably mounted for movement between a locking position for holding the detent in disengaged position to an unlocking position to free the detent, a lock release member carried by one of said members, a stub shaft slidably carried by the driven member and means actuated by axial movement of the stub shaft for operating the lock release member to free the detent from said locking member.

4. A torque overload control device comprising in combination with a driver member, a driven member, and a detent radially carried by the driver member spring urged into engagement with the driven member and disengaged therefrom at a predetermined torque load, a locking sleeve carried by the driver member, said locking sleeve being slidably mounted for movement between a locking position for holding the detent in the disengaged position to an unlocking position to free the detent, spring means urging the locking sleeve into locking position, a stub shaft slidably carried by the driven member, a lock release member secured to the stub shaft whereby the locking sleeve is urged into the unlocked position against the tension of the spring means by axial movement of the stub shaft.

References Cited in the file of this patent

UNITED STATES PATENTS

| Number | Name | Date |
|---|---|---|
| 2,263,709 | Van Sittert | Nov. 25, 1941 |
| 2,401,992 | Waller | June 11, 1946 |
| 2,412,630 | Nelson | Dec. 17, 1946 |
| 2,497,893 | Linahan | Feb. 21, 1950 |
| 2,537,672 | James | Jan. 9, 1951 |